Dec. 8, 1936.    A. G. SUELFLOW ET AL    2,063,769
CULTIVATOR
Filed Dec. 7, 1934    2 Sheets-Sheet 1
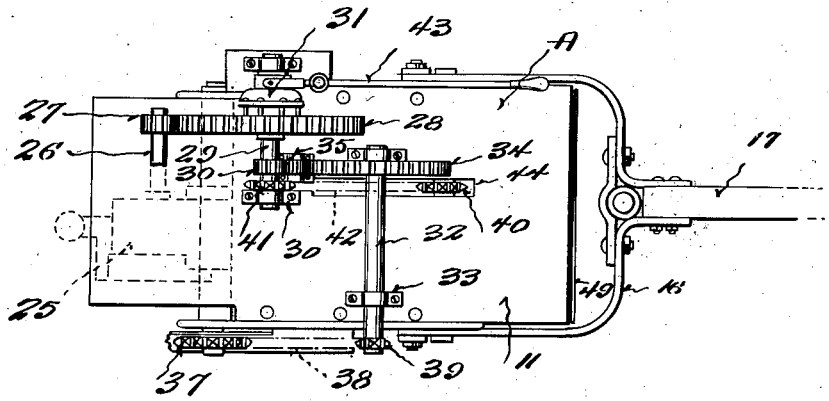

Dec. 8, 1936.  A. G. SUELFLOW ET AL  2,063,769
CULTIVATOR
Filed Dec. 7, 1934
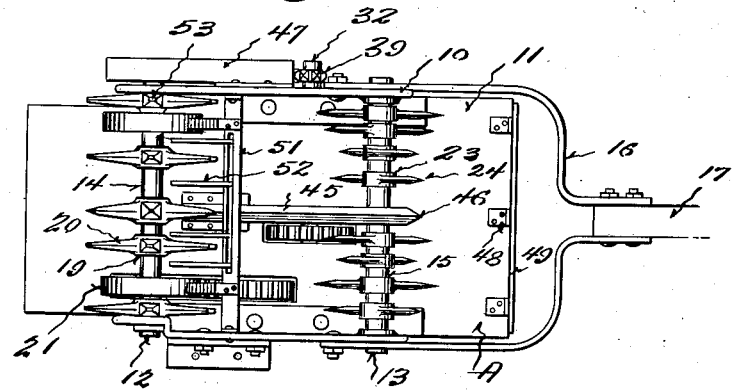
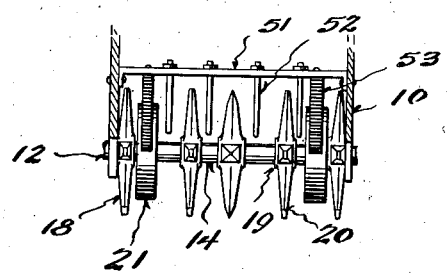
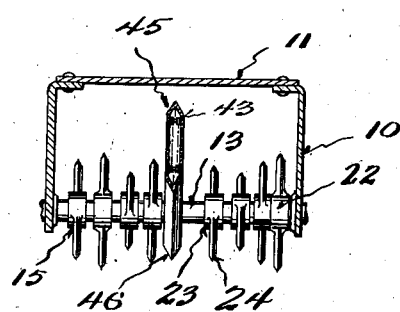

Patented Dec. 8, 1936

2,063,769

UNITED STATES PATENT OFFICE 2,063,769

CULTIVATOR

Alfred G. Suelflow and Charles C. Wolford, Milwaukee, Wis., assignors to Felins Tying Machine Co., Milwaukee, Wis., a corporation of Wisconsin Application December 7, 1934, Serial No. 756,399

2 Claims. (Cl. 97—40)

This invention appertains to garden implements, and more particularly to a light, power-driven, soil cultivator, adaptable for use in small gardens, hot houses, and so forth.

One of the primary objects of our invention is to provide a cultivator embodying power-driven front and rear rotary earth-working implements, so constructed and arranged as to draw the device forwardly over the ground, and at the same time effectively pulverize the soil.

Another salient object of our invention is to provide a cultivator having a front, slowly rotating member, embodying a plurality of teeth shaped to break through the crust of the top soil, and to draw the device forwardly over the ground, and a rear, faster rotating member having teeth shaped to effectively break up the earth clods and pulverize the same.

A further object of our invention is the provision of a metal apron disposed in the rear of the rotary members functioning to guard the operator against rearwardly flung earth clods, and to break up these clods and distribute the same over the earth surface.

A still further object of our invention is to provide a rotary cultivator of the above character, which will be durable and efficient in use, one that will be simple and easy to manufacture, one which can be placed upon the market at a reasonable cost, and one which can be easily handled by the operator without undue exertion.

With these and other objects in view, the invention consists in the novel construction, arrangement, and formation of parts, as will be hereinafter more specifically described, claimed, and illustrated in the accompanying drawings, in which drawings:

Figure 1 is a top plan view of the improved cultivator the prime mover therefor being shown in dotted lines.

Figure 2 is a side elevation of the cultivator with the engine removed.

Figure 3 is a fragmentary longitudinal section through the cultivator, illustrating the guard utilized for protecting the drive mechanism for the rear rotary member.

Figure 4 is a bottom plan view of the improved cultivator.

Figure 5 is a fragmentary transverse section through the implement, showing the front rotary member.

Figure 6 is a fragmentary transverse section through the implement taken substantially on the line 6—6 of Figure 2, looking in the direction of the arrows.

Referring to the drawings in detail, wherein similar reference characters designate corresponding parts throughout the several views, the letter A generally indicates our improved cultivator, which comprises a supporting frame preferably consisting of side metal plates 10, and a connecting top plate 11. Journaled in suitable bearings carried by the side plates 10 are the front and rear rotary shafts 12 and 13, which form a part of the front and rear rotary earth-working members 14 and 15, which will be later described in detail.

Rigidly bolted or otherwise secured to the side plates 10 is the rearwardly and upwardly extending yoke 16, to which is fastened the operator's handle 17.

Referring more particularly to the front earth-working implement 14, it will be noted that the same embodies a plurality of equi-distantly spaced digging members 18, each of which includes a hub 19, and radially extending teeth 20. The forward ends of the teeth 20 are preferably of a hook shape, and the same are adapted to dig into the ground and break up the top soil. The hubs 19 of the members 18 are rigidly secured to the shaft 12 in any desired manner for rotation therewith, and one end of the shaft extends laterally from the adjacent side plate 10, for a purpose which will be later described. Rigidly secured to the shaft 12 in any desired manner are a pair of spaced ground wheels 21, and, as shown, these wheels are of a less diameter than the diameter of the earth-working members 18, and serve as a means for limiting the insertion of the teeth 20 into the ground. The shaft 12 is adapted to be driven in a counter-clockwise direction (referring to Figure 2), and thus as the teeth 20 dig into the ground, the same will function to draw the machine forwardly and thus effectively advance the same over the ground.

The rear earth-working member 15 also includes a plurality of digging and pulverizing members 22, each of which embodies a hub 23 and radially extending teeth 24. The hubs 23 are rigidly secured to the shaft 13 in any preferred manner for rotation therewith. The rear earth-working member 15 functions to break up the soil and pulverize the same.

As heretofore intimated, the front and rear shafts 12 and 13 are power-driven, and hence a suitable power plant, such as a small internal combustion engine 25 is fastened to the top plate 11. The propeller shaft 26 of the motor has keyed or otherwise secured thereto a pinion 27, which is in constant mesh with a relatively large gear wheel 28 rotatably mounted on a cross shaft 29. This cross shaft 29 is mounted in suitable bearings 30 fastened to the upper face of the top plate 11. A clutch 31 of any preferred character is utilized for connecting the gear wheel with the cross shaft 29.

Arranged in rear of the cross shaft 29 is a second cross shaft 32, which is also mounted in suitable bearings 33 carried by the top plate 11. The inner end of the cross shaft 32 has keyed or otherwise secured thereto a relatively large gear wheel 32, which meshes with an idler pinion 35. This idler pinion 35 is in constant mesh with a driving pinion 36, keyed or otherwise secured to the shaft 29. The extended end of the shaft 12 of the front earth-working member 14 has secured thereto a sprocket wheel 37, and the same has trained thereabout a drive sprocket chain 38. The sprocket chain 38 is in turn trained over a sprocket wheel 39, keyed or otherwise secured to the cross shaft 32.

The shaft 13 of the rear earth-working member 15 is driven from the cross shaft 29, and thus these two shafts are provided respectively with sprocket wheels 40 and 41, which have trained thereover a driving sprocket chain 42.

From the construction so far, it can be seen that as the front earth-working member 14 is driven from the shaft 32, the same rotates at much less speed than the rear earth-working member 15, which is driven from the cross shaft 29. Obviously, the rotation of the earth-working members is controlled by the clutch 31, which is preferably provided with a rearwardly extending operating lever 43 disposed in a convenient position for actuation by the operator.

The sprocket chain 42 extends through a slot 44 formed in the top plate 11, and a suitably rigid guard 45 is provided therefor. The shaft 13 of the rear earth-working member extends through this guard, and the guard forms an additional support for this shaft.

In order to facilitate movement of the guard over the ground, the same is preferably beveled to provide a sharp leading edge 46.

By referring to Figure 4 of the drawings, it will be noted that one of the front earth-working members 18 is arranged directly in longitudinal alinement with the guard 45, and consequently serves as a means for breaking up the ground in advance of the guard, so as to facilitate the movement of the guard over and through the top soil.

If preferred, a light sheet metal guard 47 can be provided for the sprocket wheel 37 and the sprocket chain 38.

Hingedly connected to the rear edge of the plate 11, as at 48, is a depending metal apron 49. This apron is disposed in rear of both the earth-working implements, and serves as means for preventing earth from being thrown back on the operator. Thus the apron also functions to break up the earth clods, and to distribute the same over the earth surface.

We preferably mount a caster wheel 50 on the handle 17 in rear of the frame, and this caster wheel facilitates the guiding of the machine, and also limits the insertion of the earth-working teeth into the ground. The operator, by pressing down on the handle 17, can lift the front end of the machine to a certain extent above the ground, which facilitates turning of the machine, and traveling thereof over surfaces not to be operated upon.

In order to more effectively break up the earth clods, and to prevent adhering of the dirt to the front earth-working implement, we provide a front cross bar 51, having connected therewith a plurality of forwardly and downwardly projecting tines or fingers 52. These tines or fingers extend in between the teeth of the digging members 18.

While we have shown the teeth of the front digging members 18 all in longitudinal alinement, it is to be understood that the teeth of these members can be staggeredly related relative to one another.

Metal scraper blades 53 can be provided for the front ground wheels 21, and as illustrated, these blades are of a resilient nature and are secured to the cross bar 51, and frictionally engage the wheels 21.

From the foregoing description, it can be seen that we have provided an exceptionally simple earth cultivator, which will effectively work and pulverize the top soil without undue effort on the part of the operator.

Changes in details may be made without departing from the spirit or scope of our invention, but what we claim as new is:—

1. In a cultivator comprising a frame, front and rear earth-working implements supported by the frame, each including rotatable shafts and a plurality of sets of radially extending teeth, a prime mover, means for driving the shafts from the prime mover, a rearwardly inclined guard for the driving mechanism of the rear shaft having a front pointed leading edge, one set of teeth of the front shaft being disposed directly in front of the guard.

2. In a cultivator, a frame, front and rear earth working implements supported by the frame, each including rotatable shafts and a plurality of sets of radially extending teeth, a prime mover, means for driving the shafts from the prime mover, and a rearwardly and downwardly inclined guard for the driving mechanism of the rear shaft having a front pointed leading soil engaging edge.

ALFRED G. SUELFLOW.
CHARLES C. WOLFORD.